(12) United States Patent
Habara et al.

(10) Patent No.: US 12,242,862 B2
(45) Date of Patent: Mar. 4, 2025

(54) DATA PROCESSING SYSTEM AND DATA PROCESSING METHOD

(71) Applicant: Hitachi, Ltd., Tokyo (JP)

(72) Inventors: Takuya Habara, Tokyo (JP); Shinichiro Saito, Tokyo (JP); Daisuke Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 115 days.

(21) Appl. No.: 18/179,018

(22) Filed: Mar. 6, 2023

(65) Prior Publication Data

US 2023/0385073 A1   Nov. 30, 2023

(30) Foreign Application Priority Data

May 24, 2022  (JP) .................................. 2022-084880

(51) Int. Cl.
*G06F 9/44* (2018.01)
*G06F 9/445* (2018.01)

(52) U.S. Cl.
CPC .............................. *G06F 9/44505* (2013.01)

(58) Field of Classification Search
CPC ................. G06F 1/32; G06F 9/44; G06F 1/12
See application file for complete search history.

(56) References Cited

U.S. PATENT DOCUMENTS

| 9,043,524 B2* | 5/2015 | Sakamoto | H04L 12/4637 710/305 |
| 2008/0040582 A1* | 2/2008 | Zhang | G06F 9/4812 712/220 |
| 2018/0150336 A1* | 5/2018 | Shirakawa | G06F 9/4806 |

FOREIGN PATENT DOCUMENTS

JP   2018088114 A   6/2018

* cited by examiner

*Primary Examiner* — Keshab R Pandey
(74) *Attorney, Agent, or Firm* — Volpe Koenig

(57) ABSTRACT

A data processing unit required for the data processing is started and a data processing unit not required for the data processing is stopped to change a part of the data processing settings or to add a new data processing setting without stopping the multi-stage data processing, and when the multi-stage data processing is executed, a rear-stage data processing unit reads the tag assigned in a front-stage data processing unit to discriminate the data processing unit that executes the data processing.

9 Claims, 11 Drawing Sheets

FIG. 5

| DATA PROCESSING UNIT | STATUS | DATA FLOW NAME | DATA PROCESSING SETTING | TAG |
|---|---|---|---|---|
| DATA PROCESSING UNIT 1 | START | flow1 | DATA PROCESSING SETTING A | 1101 |
| | | flow2 | DATA PROCESSING SETTING B | 2101 |
| | | flow3 | DATA PROCESSING SETTING C | 3101 |
| DATA PROCESSING UNIT 1' | STOP | flow1 | DATA PROCESSING SETTING A | 1201 |
| | | flow2 | DATA PROCESSING SETTING B | 2201 |
| | | flow3' | DATA PROCESSING SETTING C' | 3201 |
| DATA PROCESSING UNIT 2 | START | flow4 | DATA PROCESSING SETTING D | 1102 |
| | | flow5 | DATA PROCESSING SETTING E | 2102 |
| | | flow6 | DATA PROCESSING SETTING F | 3102 |
| DATA PROCESSING UNIT 2' | STOP | flow4 | DATA PROCESSING SETTING D | 1202 |
| | | flow5 | DATA PROCESSING SETTING E | 2202 |
| | | flow6' | DATA PROCESSING SETTING F' | 3202 |

FIG. 6

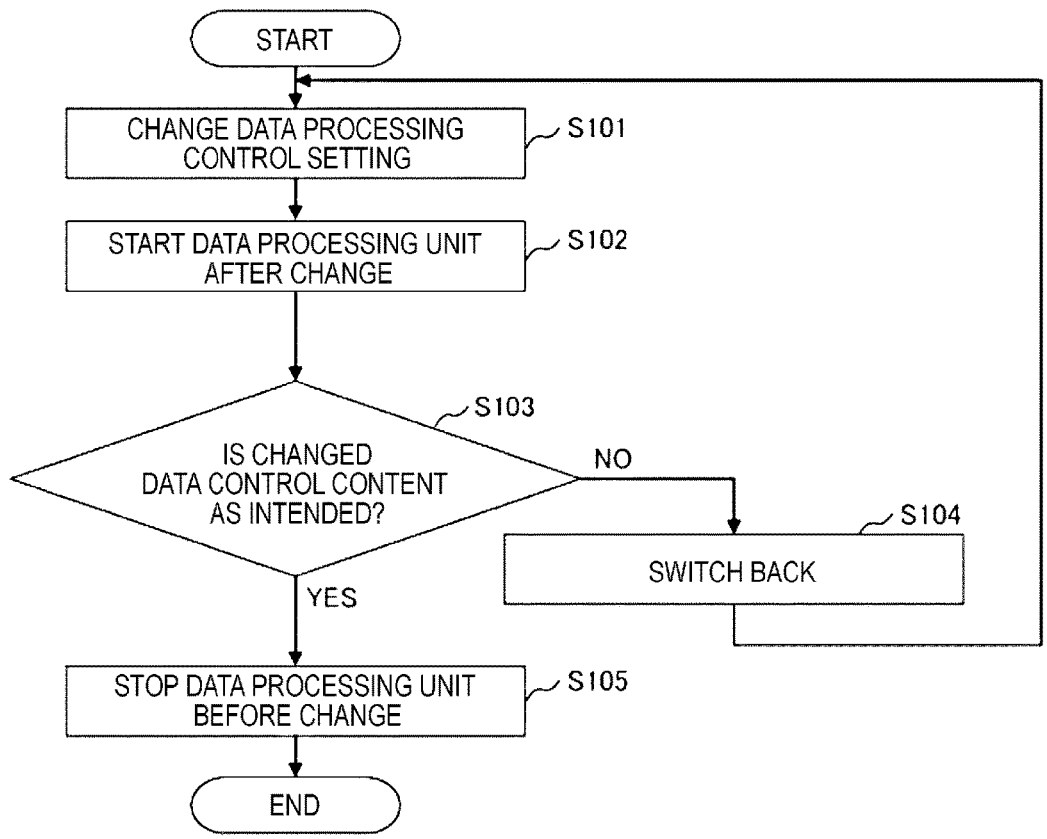

DATA PROCESSING SYSTEM AND DATA PROCESSING METHOD

BACKGROUND OF THE INVENTION

Field of the Invention

The present invention relates to a data processing system and a data processing method.

Description of Related Art

As a utilization method of Internet of Things (IoT), there is a case where data of various locations in a range from a device provided at an edge of a factory site or the like to a machine on a cloud service are collected, processed, and analyzed to improve an operation. For effective IoT utilization, a data collection platform that collects, processes, and stores data and can deal with a difference in data format between sites or an increase and decrease in data volume is required.

In the data collection platform, data processing is executed in multiple stages. For example, a case can be considered where the data collection platform is cut into data processing units per process such as data collection, data processing, or data storage and the data processing units are connected in multiple stages to execute data processing. The data processing unit can be implemented in various forms such as a virtual machine (VM), a container, or a process.

By dividing the data processing flow into a plurality of data processing units per process, it is easy to scale out only a process having a high data processing load or to execute data processing branched from one data processing result. In the present specification, the data processing flow refers to a series of operations of acquiring data from a data source, processing the acquired data, and storing the processed data in a data sink. The data processing units are connected through a message queue. By using the message queue, the availability of data can be secured or data can be sequenced. When the scale of data collection increases such that a large volume of data processing flow needs to be processed, computer resources are consumed more than necessary by operating the data processing units of all the flows independently of each other. Therefore, for the data collection platform, it is required to execute a plurality of data processing operations of different data processing flows in parallel in one data processing unit.

In a circumstance where data processing units that simultaneously execute a plurality of data processing flows are connected in multiple stages to execute data processing, a configuration of changing a part of data processing settings depending on a change in an operation of a data collection target or a change in information to be acquired can be considered. One data processing unit encloses a data processing setting regarding a data processing flow that needs to be changed and a data processing setting regarding a data processing flow that does not need to be changed.

When a data processing setting is changed, in general, data processing needs to be temporarily stopped. In the data processing unit that encloses a plurality of data processing settings, there is a problem in that the data processing of the data processing flow that does not need to be changed is also stopped. When data processing is executed for use where real time is required, a system that continues the data processing without being affected by data processing setting change of another data processing flow is required.

As a technique of updating data processing settings of data processing without stopping the data processing, a technique described in JP2018-88114A is known. JP2018-88114A describes that "a management system determines one of virtual machines to which a request is transferred from a load balancer, and when a setting of an apparatus that receives a request from a client is switched from a load balancer in a first processing environment to a load balancer in a second processing environment, the management system transfers the request from the load balancer in the first processing environment to a virtual machine in the second processing environment and prevents the load balancer in the first processing environment from transferring the request to a virtual machine in the first processing environment."

The technique described in JP2018-88114A shows a system upgrade method using a Blue-Green deployment where an operation of starting two systems including a new system and an old system and providing a switch before data processing units to switch between the data processing units is executed, in which even when a request is transmitted from the client to an apparatus before update, the request can be executed in the updated apparatus. By using the technique described in JP2018-88114A, the data processing settings can be updated.

However, when the data processing units are provided in multiple stages, unless whether data processing settings with which data processing is executed in a front-stage data processing unit are settings of the old system or settings of the new system can be grasped, whether data processing is executed with old data processing settings or new data processing settings in a rear-stage data processing unit cannot be determined. For use where multi-stage data processing is executed, the technique of JP2018-88114A does not always exhibit the effect.

SUMMARY OF THE INVENTION

An object of the present invention is to change data processing settings of multi-stage data processing in a data processing system without stopping the data processing.

A data processing system according to one aspect of the present invention is a data processing system that executes multi-stage data processing by changing a part of a plurality of data processing settings or adding a new data processing setting in a state where the data processing settings are mixed in data processing units, the data processing system including a data control design unit and a data control management unit, in which the data control design unit assigns a tag as an identifier to each of the data control settings, the data control management unit starts a data processing unit required for the data processing and stops a data processing unit not required for the data processing to change a part of the data processing settings or to add a new data processing setting without stopping the multi-stage data processing, and when the multi-stage data processing is executed, a rear-stage data processing unit reads the tag assigned in a front-stage data processing unit to discriminate the data processing unit that executes the data processing.

According to the aspect of the present invention, data processing settings of multi-stage data processing can be changed in a data processing system without stopping the data processing.

BRIEF DESCRIPTION OF THE DRAWINGS

FIG. 5 is a diagram illustrating an example of the user output unit according to the first embodiment and the second embodiment;

FIG. 6 is a diagram illustrating an operation procedure of the first embodiment;

DESCRIPTION OF EMBODIMENTS

Figure 1:
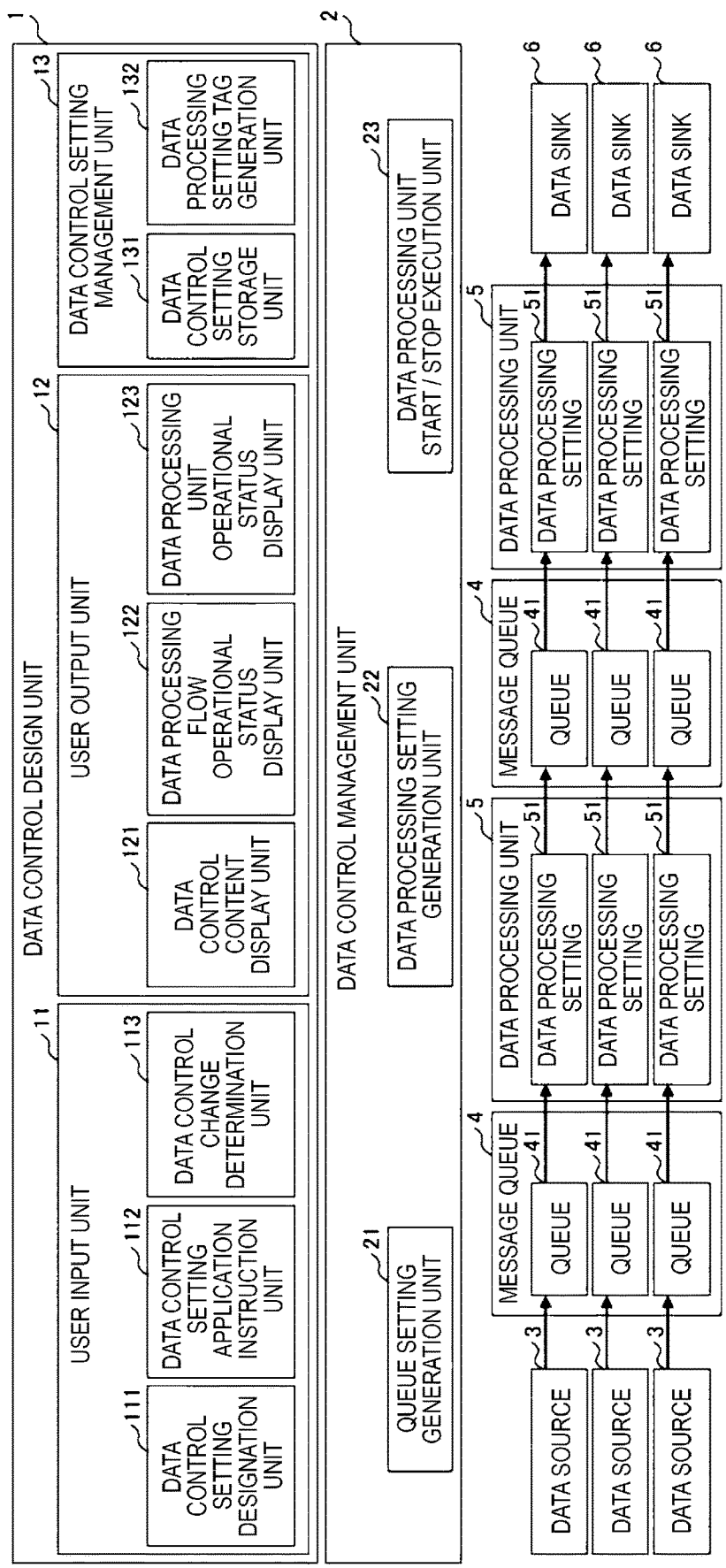
FIG. 1 is a diagram illustrating an example of a configuration of a data processing system according to a first embodiment and a second embodiment.

Hereinafter, embodiments of the present invention will be described using the drawings. Note that the contents described in the following embodiments are not intended to limit the present invention. A person skilled in the art can easily understand that a specific configuration of the present invention can be changed within a range not departing from the spirit of the present invention.

In a configuration of the present invention that is described below, the same or similar components or functions will be represented by the same reference numerals, and the description thereof will not be repeated.

For easy understanding of the present invention, the position, size, shape, range, and the like of each of the components illustrated in the drawings do not necessarily represent the actual ones. Accordingly, the present invention is not necessarily limited to the position, size, shape, range, and the like illustrated in the drawings.

First Embodiment

In a first embodiment, in a circumstance where data processing units that simultaneously execute a plurality of data processing flows are connected in multiple stages to execute data processing, when there is a change in an operation of a data collection target or a change in information to be acquired, a procedure of changing data control settings without stopping data processing will be described.

FIG. 1 is a diagram illustrating an example of a configuration of a data processing system according to the first embodiment.

The data processing system includes a data control design unit 1, a data control management unit 2, data sources 3, message queues 4, data processing units 5, and data sinks 6.

The data control design unit 1 includes, as a functional configuration, a user input unit 11, a user output unit 12, and a data control setting management unit 13.

The user input unit 11 includes a data control setting designation unit 111, a data control setting application instruction unit 112, and a data control change determination unit 113. The data control setting designation unit 111 receives an input regarding data control settings and transmits the input content to the data control setting management unit 13. The data control settings refer to settings of queues 41 that execute data delivery in the message queues 4 and data processing settings 51 that are executed in the data processing units 5.

The data control setting application instruction unit 112 receives an input regarding start or stop of the data control settings that are managed by the data control setting management unit 13, and transmits the input content to the data control management unit 2. The data control change determination unit 113 receives an input regarding whether to reflect the data control setting that is operated in response to the input of the data control setting application instruction unit 112 or to switch back without reflecting the data control setting from the data control setting designation unit 111, and transmits the input content to the data control management unit 2.

The user output unit 12 includes a data control content display unit 121, a data processing flow operational status display unit 122, and a data processing unit operational status display unit 123. The data control content display unit 121 displays a setting content of the data control settings that are managed by the data control setting management unit 13. The data processing flow operational status display unit 122 displays operational statuses of the data control settings that are managed by the data control setting management unit 13. The data processing unit operational status display unit 123 displays the data processing units 5 and the data processing settings 51 that are executed in the data processing units 5, and shows the operational statuses of the data processing units 5.

The data control setting management unit 13 includes a data control setting storage unit 131 and a data processing setting tag generation unit 132. The data control setting storage unit 131 stores the content input from the data control setting designation unit 111. The data processing setting tag generation unit 132 generates a unique tag for each of the data processing settings 51 of the data control settings stored in the data control setting storage unit 131.

The data control management unit 2 includes, as a functional configuration, a queue setting generation unit 21, a data processing setting generation unit 22, and a data processing unit start/stop execution unit 23.

In response to the input of the data control setting application instruction unit 112 and the data control change determination unit 113, the queue setting generation unit 21 acquires the data control settings stored in the data control setting storage unit 131 and, when the required queue 41 is not present, generates the queues 41 in the message queue 4.

In response to the input of the data control setting application instruction unit 112 and the data control change determination unit 113, the data processing setting generation unit 22 acquires the data control settings stored in the data control setting storage unit 131, assigns the tags generated by the data processing setting tag generation unit 132 to the data control settings, and generates the data processing settings 51 that operate in the data processing units 5.

In response to the input of the data control setting application instruction unit 112 and the data control change determination unit 113, the data processing unit start/stop execution unit 23 starts and stops the data processing units 5 including the data processing settings 51.

The data sources 3 transmit the data to be processed in the system to the message queues 4. The data source 3 may be a sensor, an IoT device, a gateway, a database, or the like, and the form thereof is not particularly limited as long as it can generate data.

The message queue 4 transfers data between the data source 3 and the data processing unit 5, between the data processing unit 5 and the data processing unit 5, and between the data processing unit and the data sink using the queue 41 generated for each of data processing flows. When a failure occurs in the data processing unit 5 such that data is lost, an operation of restoring the lost data from the data stored in the queue 41 or rearranging the data processed in the data processing unit 5 in order of transmission from the data source 3 is executed.

The data processing unit 5 executes data processing in accordance with the data processing setting 51 generated for each of the data processing flows. In the data processing setting 51, the queue 41 from which data is acquired, a data processing content, and the queue 41 or the data sink 6 as a data transmission destination are described. When the data processing setting 51 is added to the data processing unit or is changed, it is necessary to newly start the data processing unit 5.

The data sink 6 stores data processed in the data processing unit 5. The data sink 6 may be an IoT device, an IoT application, a database, or the like, and the form thereof is not particularly limited as long as it can receive data.

Figure 2:
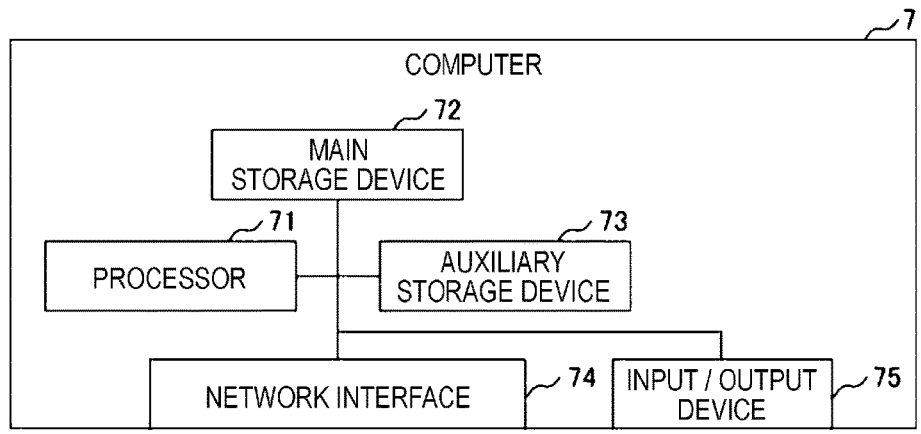
FIG. 2 is a diagram illustrating an example of a computer according to the first embodiment and the second embodiment.

FIG. 2 is a diagram illustrating an example of a computer. The data control design unit 1, the data control management unit 2, the message queue 4, and the data processing unit 5 are configured by a computer 7 illustrated in FIG. 2. The computer 7 includes a processor 71, a main storage device 72, an auxiliary storage device 73, a network interface 74, and an input/output device 75. The processor 71 executes a program stored in the main storage device 72. By executing processing in accordance with the program, the processor 71 operates as a functional unit (module) that executes a specific function.

In the following description, when a functional unit is used as a subject to describe processing, it can be considered that the processor 71 executes a program that implements the functional unit. The main storage device 72 is a memory or the like and stores a program that is executed by the processor 71 and data that is used for the program. The auxiliary storage device 73 is a hard disk drive (HDD), a solid state drive (SSD), or the like and permanently stores data. The program and the data stored in the main storage device 72 may be stored in the auxiliary storage device 73. In this case, the processor 71 reads the program and the data from the auxiliary storage device 73 and loads the program and the data to the main storage device 72. The network interface 74 communicates with another device through a network. The input/output device 75 receives an input from a user and displays the calculation result to the user. The input/output device 75 can be omitted. The computer 7 may virtually operate in the form of a VM or a container.

Figure 3:
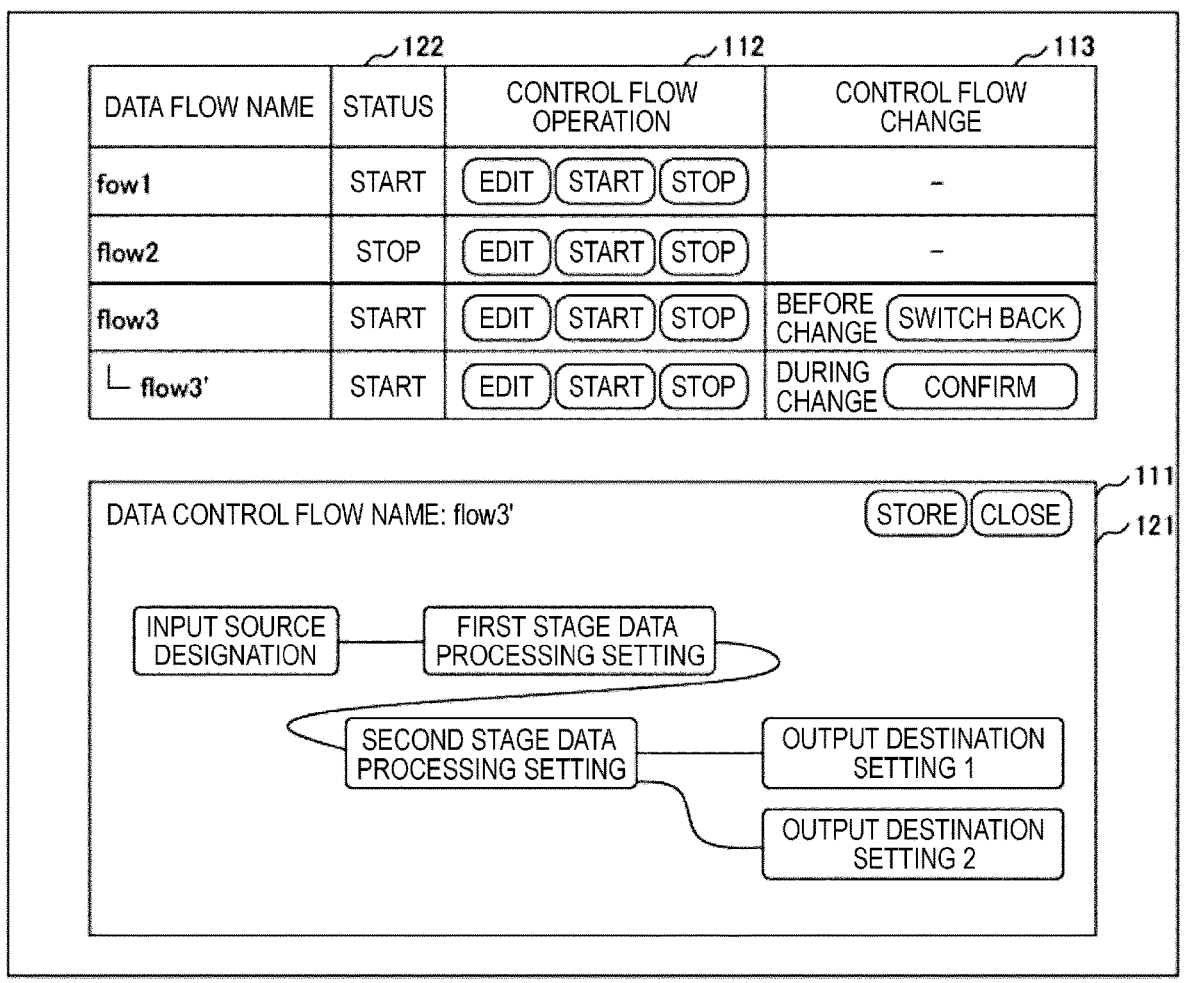
FIG. 3 is a diagram illustrating an example of a user input unit and a user output unit according to the first embodiment and the second embodiment.

FIG. 3 is a diagram illustrating an example of the user input unit and the user output unit.

In FIG. 3, flow1, flow2, and flow3 are present, and an example of the user input unit and the user output unit where flow3 is changed to flow3' is illustrated. The data processing flow operational status display unit 122 displays the state of the data processing flow such as start or stop. The data control setting application instruction unit 112 calls up an edit screen of the data processing flow and receives an input regarding start, stop, and the like. When edit is input in the data control setting application instruction unit 112, the data control setting designation unit 111 displays the edit screen of the data processing flow.

The data control setting designation unit 111 designates an input source, a data control setting, and an output destination of data that is handled by the data processing flow. In the embodiment, an example where two-stage data processing is executed is described. However, three- or more stage data processing may be executed. In addition, in the embodiment, the number of output destinations designated is 2. However, any natural number can be used as the number of output destinations designated. By generating a data control setting and inputting "store" in the data control setting designation unit 111, the data control setting storage unit 131 stores the data control setting. By inputting "close", the data control setting designation unit 111 is closed.

The data control setting designation unit 111 may display the same screen as the data control setting application instruction unit 112 as illustrated in FIG. 3 or may display a different screen. The data control change determination unit 113 is displayed for a data processing flow of which the data control setting is changed. In the example of FIG. 3, flow3 and flow3' correspond to this data processing flow. The data control change determination unit 113 receives an input of "switch back" for a data processing flow before change, and receives an input of "confirm" for a data processing flow after change. The data control content display unit 121 displays the data processing setting of the data processing flow. The data control content display unit 121 may display the same screen as the data control setting designation unit 111 or may display a different screen. When the different screen is displayed, the data control setting application instruction unit 112 receives an input to display the data processing flow.

Figure 4:
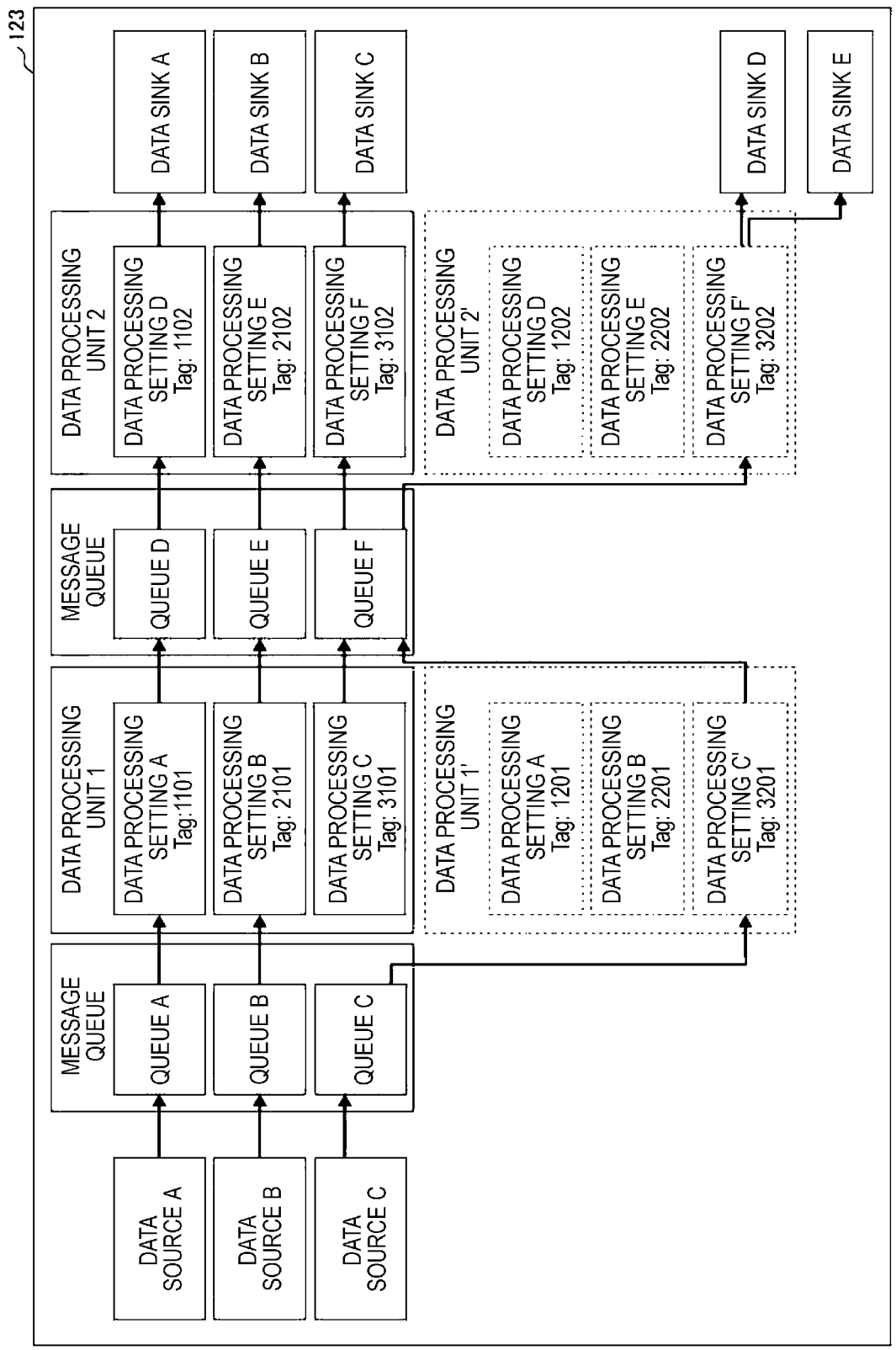
FIG. 4 is a diagram illustrating an example of the user output unit according to the first embodiment and the second embodiment.

FIG. 4 is a diagram illustrating an example of the user output unit.

The data processing unit operational status display unit 123 displays a relationship between the data processing unit 5 and the data processing settings 51 that operate in the data processing unit 5, that is, a tag of each of the data processing setting 51 based on the information stored in the data control setting storage unit 131. The data processing unit operational status display unit 123 may display a relationship between the data processing unit 5 and the data source 3, the message queue 4, and the data sink 6. The data processing unit operational status display unit 123 may display the operational status of the data processing unit 5. In the example of FIG. 4, a data processing unit 1 and a data processing unit 2 are operating, a data processing unit 1' and a data processing unit 2' are starting, and these operational statuses are indicated by a solid line and a dotted line to be distinguished from each other. The operational statuses may be distinguished from each other using another indication method.

FIG. 5 is a diagram illustrating an example of the user output unit.

The data processing unit operational status display unit 123 can display the information in a tabular format illustrated in FIG. 5 instead of FIG. 4. The data processing unit operational status display unit 123 displays a relationship between the data processing unit 5 and the data processing settings 51 that operate in the data processing unit 5, that is, a tag of each of the data processing setting 51 based on the information stored in the data control setting storage unit 131. The data processing unit operational status display unit 123 may display a relationship between the data processing unit 5 and the data source 3, the message queue 4, and the data sink 6. The data processing unit operational status display unit 123 may display the operational status of the data processing unit 5.

FIG. 6 is a diagram illustrating an operation procedure of the first embodiment.

In Step S101, the data processing control setting is changed. In Step S102, the data processing unit after the change starts.

In Step S103, whether the data control setting changed in Step S101 is as intended is determined. As the data control setting, an optimum setting varies depending on sites where the data collection platform is used. When the data control setting is changed along with a change in IoT utilization operation, a trial and error period is required for the user to generate the optimum data control setting.

When the tag stored in the data sink 6 in Step S102 is not as intended by the user, the user inputs "switch back" from the data control change determination unit 113 and proceeds to Step S104.

When the tag stored in the data sink 6 in Step S102 is as intended by the user, the user inputs "confirm" from the data control change determination unit 113 and proceeds to Step S105.

In Step S104, the process switches back to the state before the data control setting change. The data processing unit start/stop execution unit 23 stops the data processing unit 5 that has started in Step S102 to enter a state where only the data processing unit 5 before the data control setting change operates based on the information of the data processing unit 5 or the data processing setting 51 stored in the data control setting storage unit 131.

Figure 7:
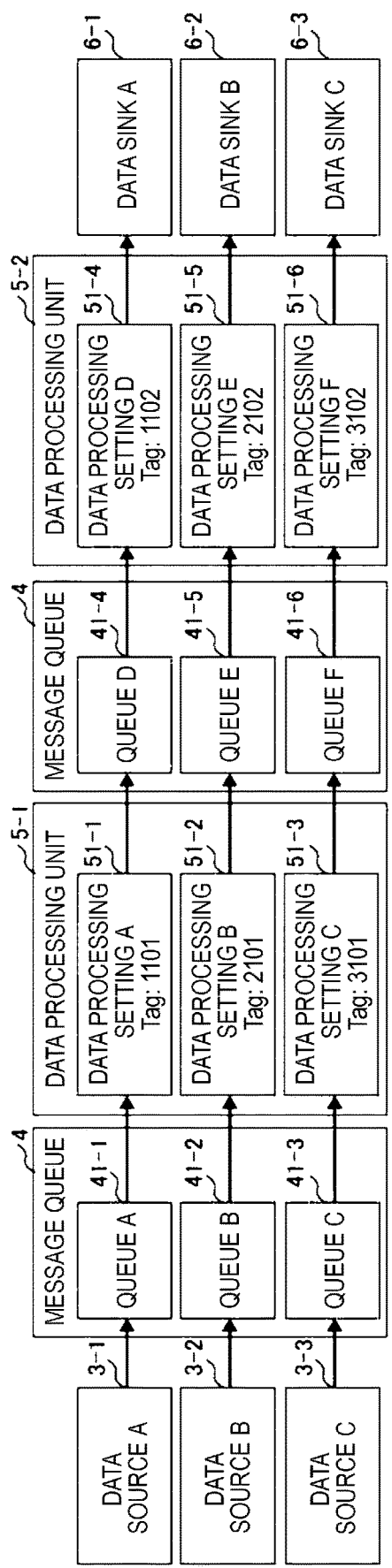
FIG. 7 is a diagram illustrating data processing flows before the start of the operation procedure of the first embodiment and the second embodiment.

FIG. 7 is a diagram illustrating data processing flows before the start of the operation procedure.

FIG. 7 illustrates three data processing flows. Data transmitted from a data source 3-1 passes through the message queues 4 and the data processing units 5 in order of a queue 41-1, a data processing setting 51-1, a queue 41-4, and a data processing setting 51-4, and is stored in a data sink 6-1.

In the data processing setting 51-1, for the data received from the data source 3-1, data processing such as metadata assignment of a key name or the like, decoding of encoded data, or numerical character conversion is described, and a data processing unit 5-1 executes the data processing based on the described content. The data processing content is not limited to this example. In the data processing setting 51-4, in order to store data in the data sink 6-1, data processing such as insertion into a relational database, execution of an application programming interface, or file writing is described, and a data processing unit 5-2 executes the data processing based on the described content. The data processing content is not limited to this example.

When an unintended failure occurs during the data processing in the data processing unit 5-1, the data transmitted from the data source 3-1 may be lost. Therefore, a message queue 41-1 is inserted between the data source 3-1 and the data processing unit 5-1, and the data is temporarily stored in the message queue 41-1. As a result, even when the data is lost in the data processing unit 5-1, the lost data can be restored from the message queue 41-1.

In addition, when an unintended failure occurs during the data processing in the data processing unit 5-2, the data transmitted from the data processing unit 5-1 may be lost. Therefore, a message queue 41-4 is inserted between the data processing unit 5-1 and the data processing unit 5-2, and the data is temporarily stored in the message queue 41-4. As a result, even when the data is lost in the data processing unit 5-1, the lost data can be restored from the message queue 41-4.

The message queue 4 has an important function of securing data availability in the data processing flow. Therefore, when the data control setting is changed in response to an input from the data control setting designation unit 111, the data control management unit 2 changes only the data processing setting 51 without changing the queue 41. In FIG. 7, "1101" is set to the data processing setting 51-1 as the tag, and "1102" is set to the data processing setting 51-4 as the tag. The tag "1101" is assigned to the data processed using the data processing setting 51-1. Therefore, by checking the tag value "1101", the rear-stage data processing unit 5 or the data sink 6 can check "whether the data is the data processed in the data processing unit 5-1 using the data processing setting 51-1". As long as the tag value is unique in the system, the format or the string length thereof is not particularly limited.

A data source 3-2 and a data source 3-3 are data sources 3 different from the data source 3-1. The queues 41 that pass through the message queue 4, the data processing setting 51 that is executed in the data processing units 5, and the data sinks 6 are also different. The data processing unit 5-1 processes data received from the data source 3-1, the data source 3-2, and the data source 3-3 using the data processing setting 51-1, a data processing setting 51-2, and a data processing setting 51-3 that are different. The data processing setting 51-1, the data processing setting 51-2, and the data processing setting 51-3 are executed in the same data processing unit 5-1. Although the data processing setting 51-1, the data processing setting 51-2, and the data processing setting 51-3 can also be executed in different data processing units 5, a larger amount of computer resources are consumed as compared to the case where the data processing setting 51-1, the data processing setting 51-2, and the data processing setting 51-3 are executed in one data processing unit 5.

When the number of data processing flows increases, in order to prevent the consumption of computer resources from increasing, for the data collection platform, it is required to execute a plurality of data processing operations of different data processing flows in parallel in one data processing unit 5. In the embodiment, a plurality of data processing settings 51 are operated in one data processing unit 5.

When a change in data input from the data source 3 or a change in data processing that is executed by the data processing unit 5 is required along with a change in IoT utilization operation, the process proceeds to Step S101.

In Step S101, the user inputs a new data control setting from the data control setting designation unit 111.

Figure 8:
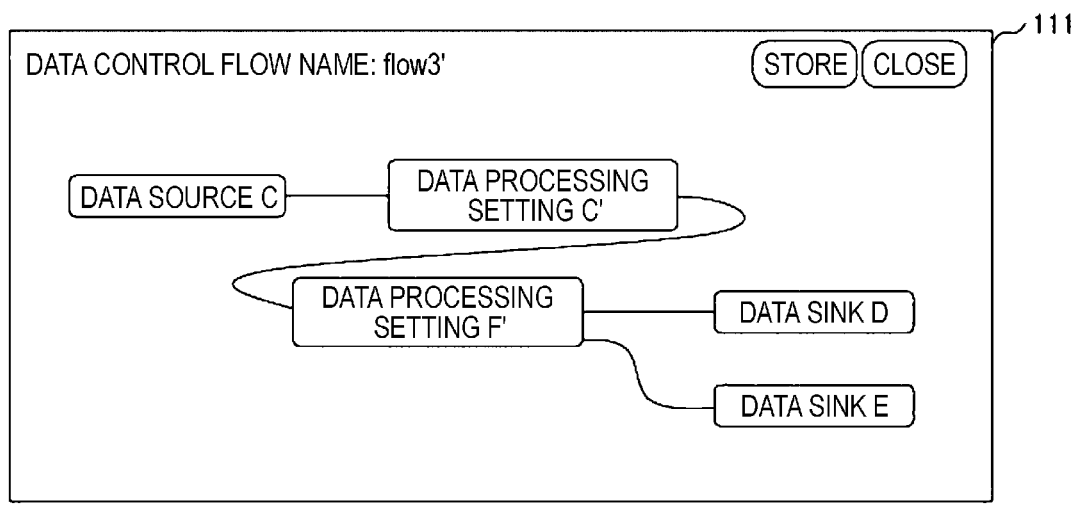
FIG. 8 is a diagram illustrating an example of a data control setting of the first embodiment.

FIG. 8 is a diagram illustrating an example of an input screen of a data control setting. FIG. 8 illustrates an example of changing a data control flow regarding the data source 3-3 of FIG. 7. The data processing setting 51-3 and a data processing setting 51-6 that operate in FIG. 7 are changed, and two data sinks 6 different from the data sink 6-3 are designated as the output destination. The newly generated data control setting is stored in the data control setting storage unit 131. In the first embodiment, it is assumed that a change in data control setting is unnecessary in the data processing flows regarding the data source 3-1 and the data source 3-2.

In Step S102, the user makes an input to start the data control setting generated in Step S101 from the data control setting application instruction unit 112. The data processing setting generation unit 22 generates a new data processing setting 51 based on the data control setting generated in Step S101. The data processing setting generation unit 22 assigns a new tag generated by the data processing setting tag generation unit 132 to the new data processing setting 51 regarding the data source 3-3.

In addition, the data processing setting generation unit 22 assigns new tags generated by the data processing setting tag generation unit 132 to the data processing settings 51 regarding the data source 3-1 and the data source 3-2 although the data processing settings 51 regarding the data source 3-1 and the data source 3-2 are not changed. The data processing contents are not changed, but the data processing unit that executes data processing is changed. Therefore, the new tags are assigned to discriminate the data processing unit 5 that executes data processing on the rear stage. The data processing unit start/stop execution unit 23 starts a new data processing unit 5 based on the relationship between the data processing settings 51 and the data processing unit 5 stored in the data control setting storage unit 131.

In the first embodiment, the data processing unit start/stop execution unit 23 starts a data processing unit 5-1' that encloses a data processing setting 51-1' and a data processing setting 51-2' regarding the data source 3-1 and the data source 3-2 and a new data processing setting 51-3' regarding the data source 3-3 generated by the data processing setting generation unit 22 to which the new tags are assigned, and starts a data processing unit 5-2' that encloses a data processing setting 51-4' and a data processing setting 51-5' regarding the data source 3-1 and the data source 3-2 and a new data processing setting 51-6' regarding the data source 3-3 generated by the data processing setting generation unit 22 to which the new tags are assigned.

Figure 9:
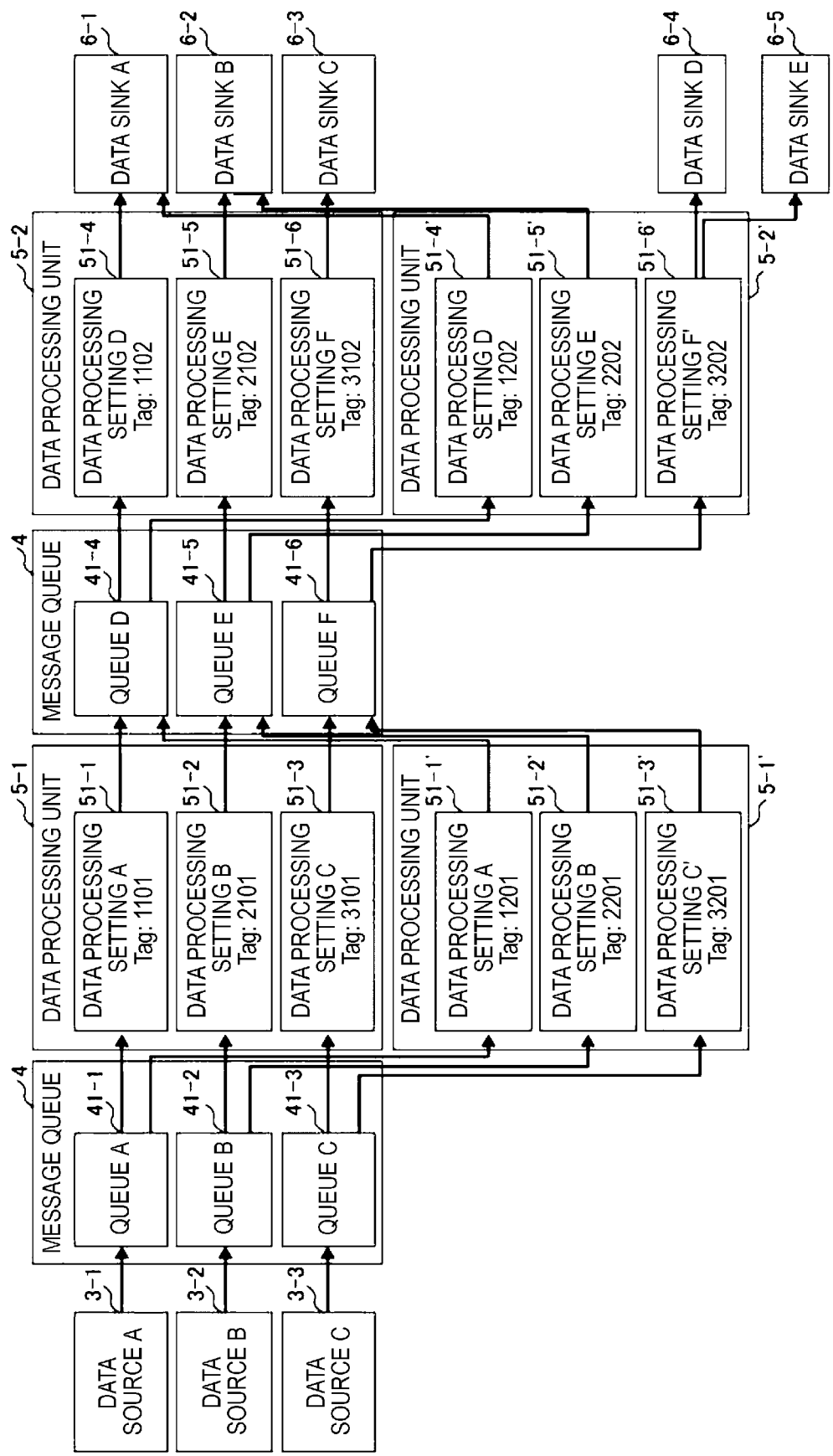
FIG. 9 is a diagram illustrating a data processing flow after partial data control setting change of the first embodiment.

FIG. 9 is a diagram illustrating a data processing flow after partial data control setting change. In addition to FIG. 7, the data processing unit 5-1' and the data processing unit 5-2' operate. Data transmitted from the data source 3-1 passes through the queue 41-1 and is processed using both of the data processing setting 51-1 and the data processing setting 51-1'. The data processing result by the data processing setting 51-1 and the data processing result by the data processing setting 51-1' are the same except for the tag values.

The data processing results by the data processing setting 51-1 and the data processing setting 51-1' pass through the queue 41-4, are processed using both of the data processing setting 51-4 and the data processing setting 51-4', and are stored in the data sink 6-1. The data processing result by the data processing setting 51-4 and the data processing result by the data processing setting 51-4' are the same except for the tag values. The data transmitted from the data source 3-1 is duplicated and stored in the data sink 6-1.

In the data collection platform, data needs to be processed without missing. During the data control setting change, data missing is prevented by duplicating and processing data. By reading the tag value, the data sink 6-1 can discriminate the data processing unit 5 that processes data. The data sink 6-1 may store all of the duplicated and stored data, or may discard one of the data based on the tag information. The data transmitted from the data source 3-2 is also processed as in the data transmitted from the data source 3-1.

Data transmitted from the data source 3-3 passes through a queue 41-3 and is processed using both of the data processing setting 51-3 and the data processing setting 51-3'. The data processing result by the data processing setting 51-3 and the data processing result by the data processing setting 51-3' are different. The data processing result by the data processing setting 51-3 is input to a queue 41-6. The data processing result by the data processing setting 51-3' is input to a queue 41-6. Regarding the data processing setting 51-6, in the data of the queue 41-6, only data that is processed using the data processing setting 51-3 and to which a tag "3101" is assigned is acquired, is processed, and is stored in the data sink 6-3. Accordingly, the data sink 6-3 stores only the data that is processed before the data control setting change.

Regarding the data processing setting 51-6', in the data of the queue 41-6, only data that is processed using the data processing setting 51-3' and to which a tag "3201" is assigned is acquired, is processed, and is stored in a data sink 6-4 and a data sink 6-5. Accordingly, the data sink 6-4 and the data sink 6-5 store only the data that is processed after the data control setting change.

In the first embodiment, when the process switches back to the state before the data control setting change in Step S104, the state returns from the state of FIG. 9 to the state of FIG. 7. In all of the data processing flows regarding the data source 3-1, the data source 3-2, and the data source 3-3, through the operation of Step S104, the data processing can be continued using the settings before the data control setting change without stopping the data processing. The user generates a new data control setting again in Step S101.

In Step S105, the data processing units 5 that have operated before the data control setting are stopped. The data processing unit start/stop execution unit 23 stops the data processing unit 5 that has operated before Step S101 to enter a state where only the data processing unit 5 that has started in Step S102 operates based on the information of the data processing unit 5 or the data processing setting 51 stored in the data control setting storage unit 131.

Figure 10:
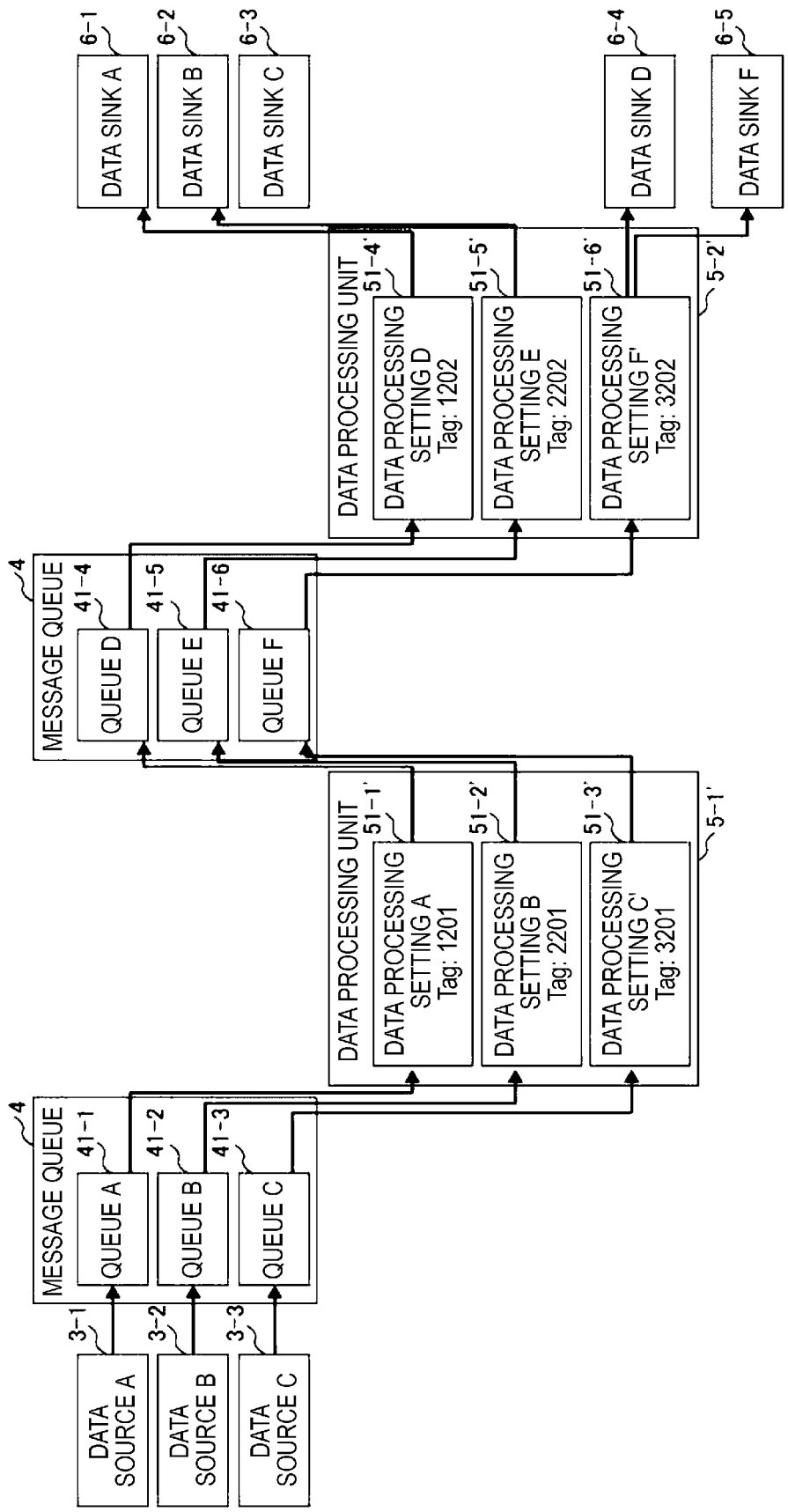
FIG. 10 is a diagram illustrating a data processing flow at the time of data control setting change completion of the first embodiment.

FIG. 10 is a diagram illustrating a data processing flow at the time of data control setting change completion.

As the data processing units 5, the data processing unit 5-1' and the data processing unit 5-2' operate. The data processing unit 5-1' executes data processing of the data processing setting 51-1' and the data processing setting 51-2' regarding the data source 3-1 and the data source 3-2 where a change in the data control setting is unnecessary and the changed data processing setting 51-3 regarding the data source 3-3 where a change in data control setting is necessary. The data processing unit 5-2' executes data processing of the data processing setting 51-4' and the data processing setting 51-5' regarding the data source 3-1 and the data source 3-2 where a change in the data control setting is unnecessary and the changed data processing setting 51-6' regarding the data source 3-3 where a change in data control setting is necessary. In a circumstance where data processing units that simultaneously execute a plurality of data processing flows are connected in multiple stages to execute data processing, when there is a change in an operation of a data collection target or a change in information to be acquired, the data control settings can be changed without stopping data processing.

Second Embodiment

In a second embodiment, in a circumstance where data processing units that simultaneously execute a plurality of data processing flows are connected in multiple stages to execute data processing, when an operation of a data collection target is added, a procedure of adding a data control setting without stopping data processing will be described.

Figure 11:
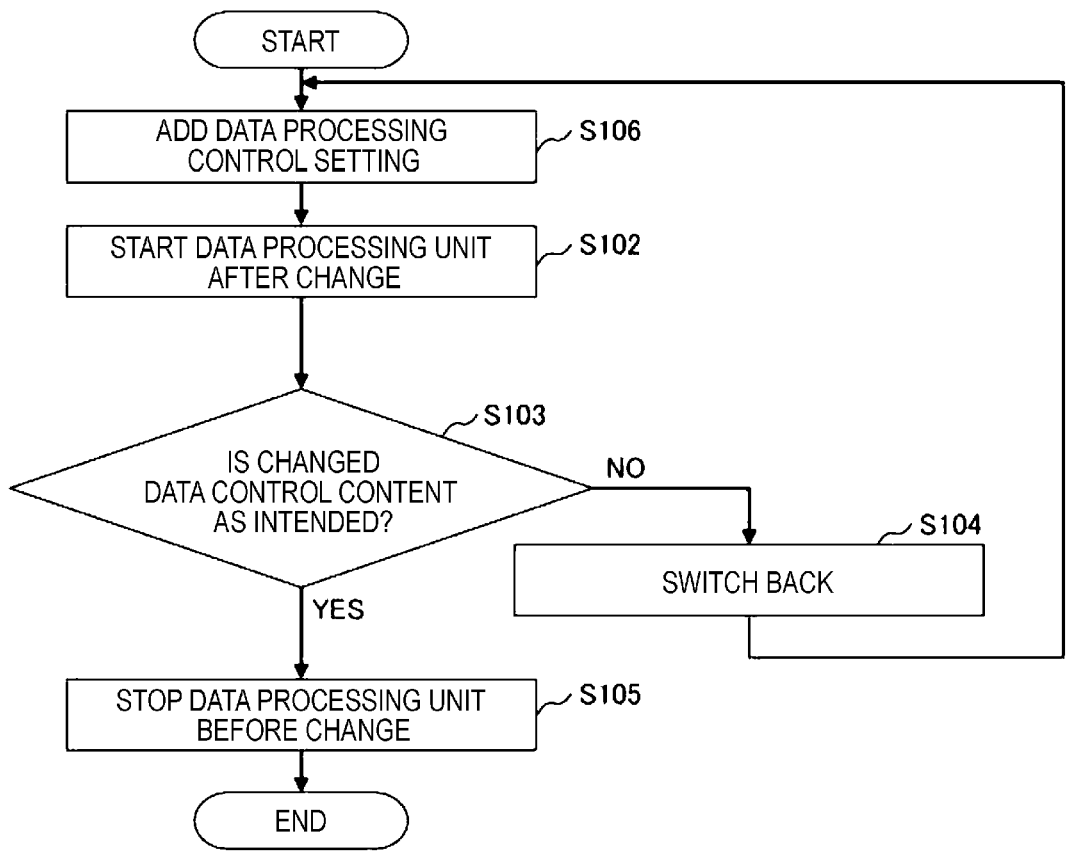
FIG. 11 is a diagram illustrating an operation procedure of the second embodiment.

An example of the system configuration of the data processing system is the same as that of FIG. 1 described in the first embodiment. An example of the computer is the same as that of FIG. 2 described in the first embodiment. An example of the user input unit and the user output unit is the same as that of FIG. 3 described in the first embodiment. An example of the user output unit is the same as that of FIGS. 4 and 5 described in the first embodiment. FIG. 11 is a diagram illustrating an operation procedure of the second embodiment. Step S102 to Step S105 are the same as those of the first embodiment.

The data processing flows before the start of the operation procedure are the same as that of FIG. 7 described in the first embodiment. When data processing needs to be added along with a change in IoT utilization operation, the process proceeds to Step S106.

In Step S106, the user inputs a data control setting to be added from the data control setting designation unit 111.

Figure 12:
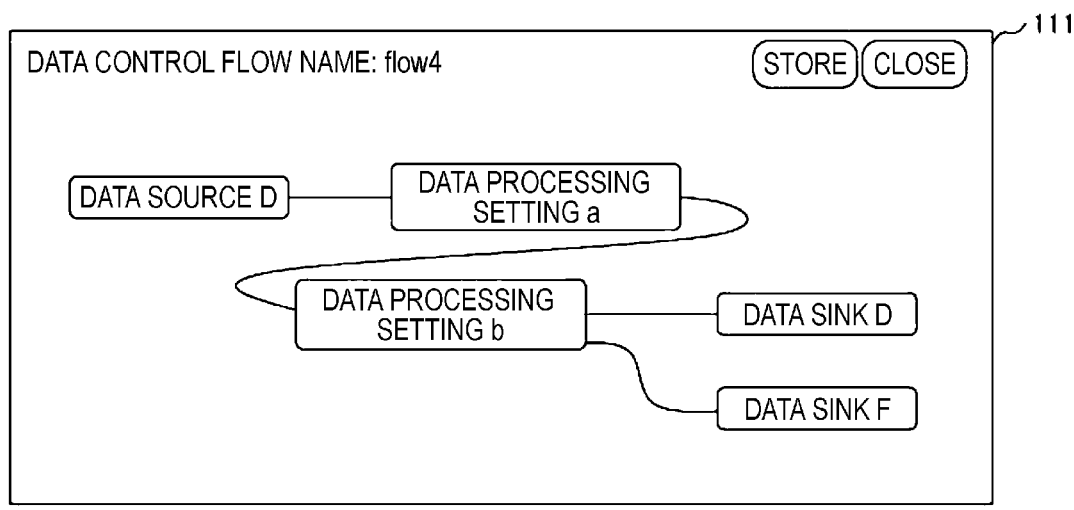
FIG. 12 is a diagram illustrating an example of an input screen of a data control setting to be added in the second embodiment.

FIG. 12 is a diagram illustrating an example of an input screen of a data control setting to be added.

The data control setting is a setting of acquiring data from a new data source and storing the data in an existing data sink and a new data sink. The newly generated data control setting is stored in the data control setting storage unit 131. In the second embodiment, it is assumed that a change in data control setting is unnecessary in the data processing flows regarding the data source 3-1, the data source 3-2, and the data source 3-3.

In Step S102, the user makes an input to start the data control setting generated in Step S106 from the data control setting application instruction unit 112. The data processing setting generation unit 22 generates a new data processing setting 51 based on the data control setting generated in Step S106. The data processing setting generation unit 22 assigns a new tag generated by the data processing setting tag generation unit 132 to the data processing setting 51 regarding a data source 3-4. In addition, the data processing setting generation unit 22 assigns new tags generated by the data processing setting tag generation unit 132 to the data processing settings 51 regarding the data source 3-1, the data source 3-2, and the data source 3-3 although the data processing settings 51 regarding the data source 3-1, the data source 3-2, and the data source 3-3 are not changed.

The data processing contents are not changed, but the data processing unit that executes data processing is changed. Therefore, the new tags are assigned to discriminate the data processing unit 5 that executes data processing on the rear stage. The data processing unit start/stop execution unit 23 starts a new data processing unit based on the relationship between the data processing settings 51 and the data processing unit 5 stored in the data control setting storage unit 131.

In the second embodiment, the data processing unit start/stop execution unit 23 starts a data processing unit 5-1" that encloses a data processing setting 51-1", a data processing setting 51-2", and a data processing setting 51-3" regarding the data source 3-1, the data source 3-2, and the data source 3-3 and a new data processing setting 51-a regarding the data source 3-4 generated by the data processing setting generation unit 22 to which the new tags are assigned, and starts a data processing unit 5-2" that encloses a data processing setting 51-4", a data processing setting 51-1 and a data processing setting 51-6" regarding the data source 3-1, the data source 3-2, and the data source 3-3 and a new data processing setting 51-b regarding the data source 3-4 generated by the data processing setting generation unit 22 to which the new tags are assigned.

Figure 13:
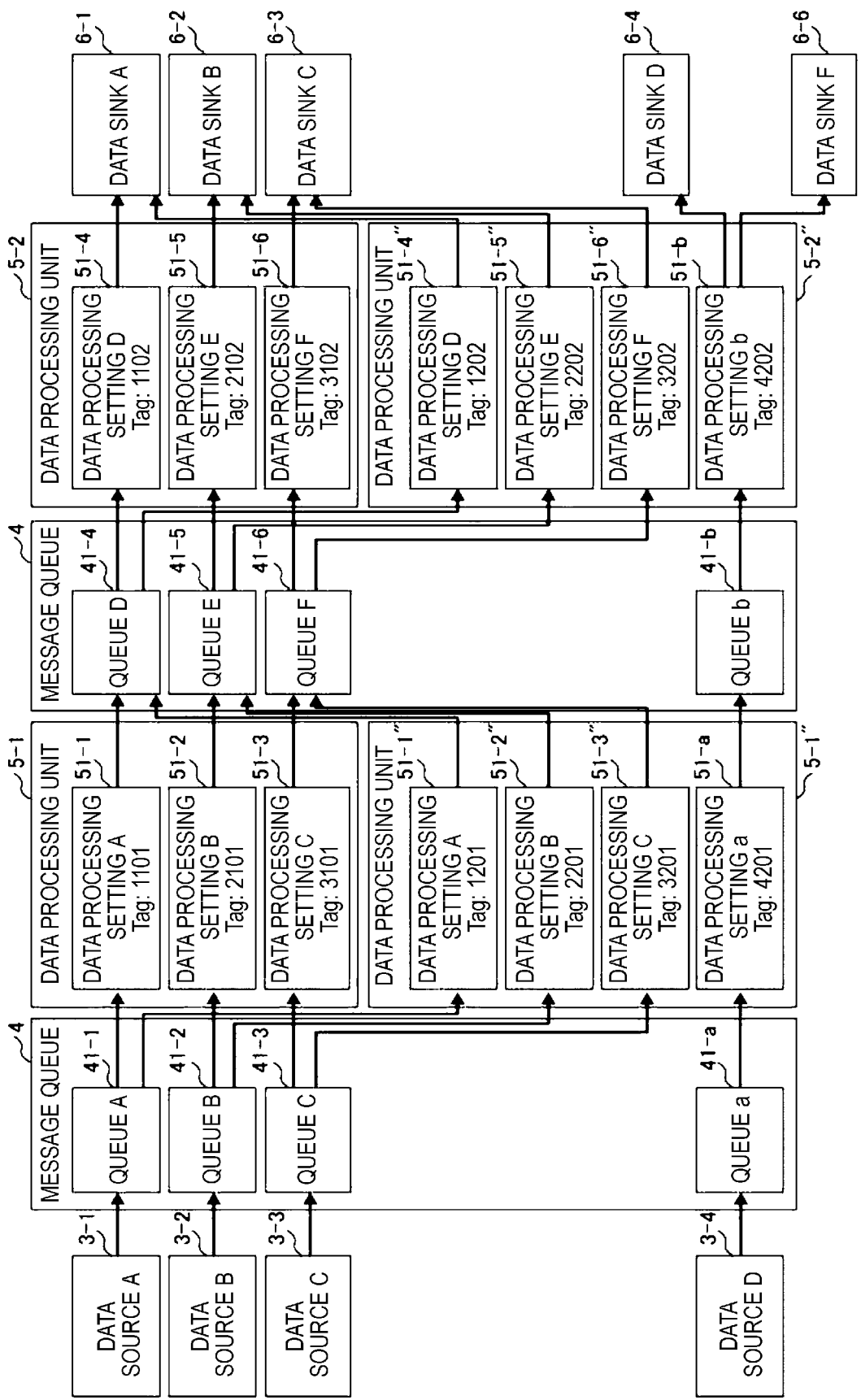
FIG. 13 is a diagram illustrating a data processing flow after data control setting addition in the second embodiment.

FIG. 13 is a diagram illustrating a data processing flow after data control setting addition. In addition to FIG. 7, the data processing unit 5-1" and the data processing unit 5-2" operate. Data transmitted from the data source 3-1 passes through the queue 41-1 and is processed using both of the data processing setting 51-1 and the data processing setting 51-1". The data processing result by the data processing setting 51-1 and the data processing result by the data processing setting 51-1" are the same except for the tag values. The data processing results by the data processing setting 51-1 and the data processing setting 51-1" pass through the queue 41-4, are processed using both of the data processing setting 51-4 and the data processing setting 51-4", and are stored in the data sink 6-1. The data processing result by the data processing setting 51-4 and the data processing result by the data processing setting 51-4" are the same except for the tag values.

The data transmitted from the data source 3-1 is duplicated and stored in the data sink 6-1. In the data collection platform, data needs to be processed without missing. During the data control setting addition, data missing is prevented by duplicating and processing data. By reading the tag value, the data sink 6-1 can discriminate the data processing unit 5 that processes data. The data sink 6-1 may store all of the duplicated and stored data, or may discard one of the data based on the tag information. The data transmitted from the data source 3-2 and the data transmitted from the data source 3-3 are also processed as in the data transmitted from the data source 3-1. Data transmitted from the data source 3-4 passes through a queue 41-a and is processed using the data processing setting 51-a. The data processing result by the data processing setting 51-a is input to a queue 41-b. Regarding the data processing setting 51-b, data of the queue 41-b is acquired, is processed, and is stored in the data sink 6-4 and a data sink 6-6.

In Step S103, whether the data control setting added in Step S106 is as intended is determined. When the data stored in the data sink 6 in Step S102 is not as intended by the user, the user inputs "switch back" from the data control change determination unit 113 and proceeds to Step S104. When the data stored in the data sink 6 in Step S102 is as intended by the user, the user inputs "confirm" from the data control change determination unit 113 and proceeds to Step S105.

In Step S104, the process switches back to the state before the data control setting addition. The data processing unit start/stop execution unit 23 stops the data processing unit 5 that has started in Step S102 to enter a state where only the data processing unit 5 before the data control setting change operates based on the information of the data processing unit 5 or the data processing setting 51 stored in the data control setting storage unit 131. In the second embodiment, the state returns from the state of FIG. 13 to the state of FIG. 7. In all of the data processing flows regarding the data source 3-1, the data source 3-2, and the data source 3-3, through the operation of Step S104, the data processing can be continued without stopping the data processing. The user generates a data control setting to be added again in Step S106.

In Step S105, the data processing units 5 that have operated before the data control setting are stopped. The data processing unit start/stop execution unit 23 stops the data processing unit 5 that has operated before Step S106 to enter a state where only the data processing unit 5 that has started in Step S102 operates based on the information of the data processing unit 5 or the data processing setting 51 stored in the data control setting storage unit 131.

Figure 14:
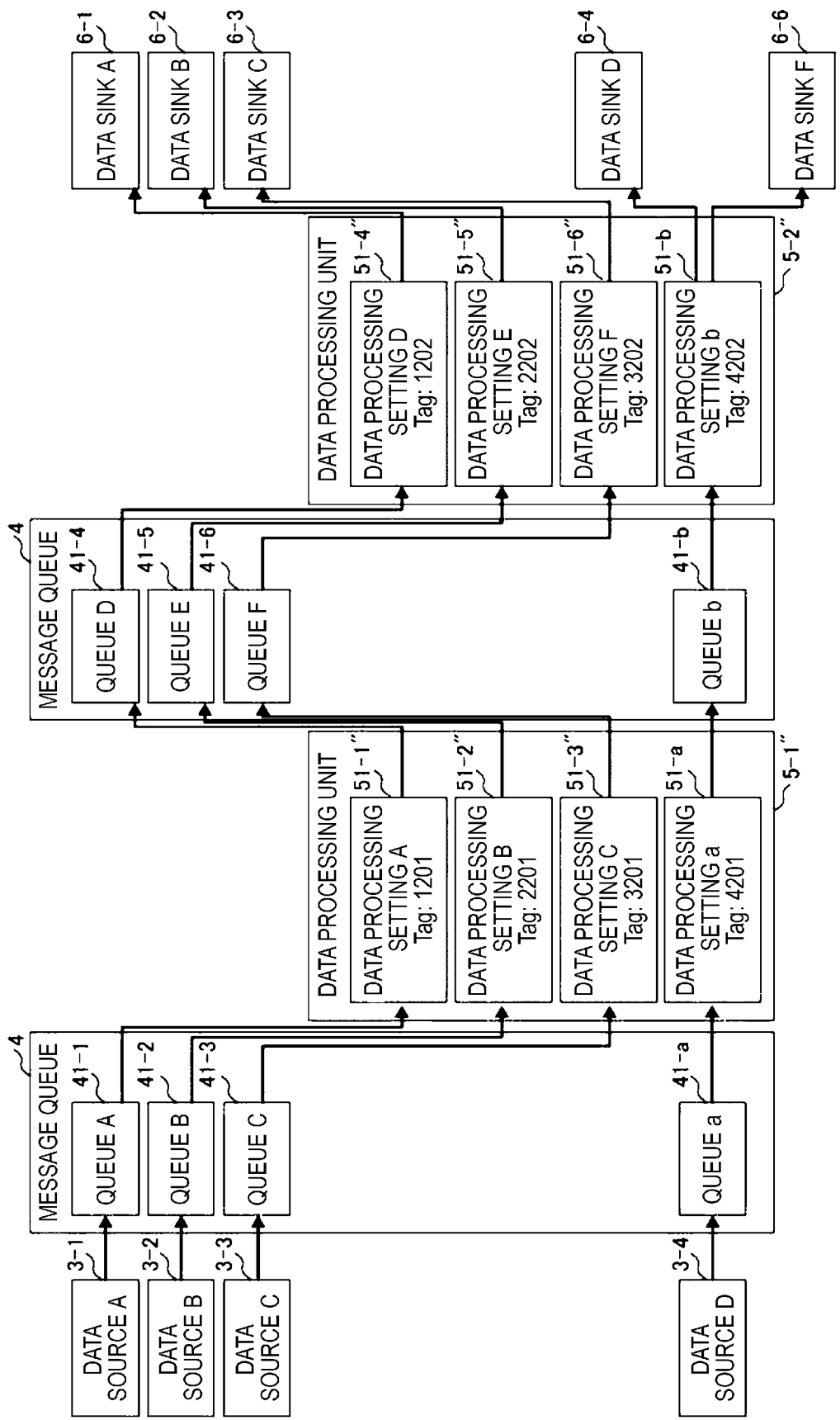
FIG. 14 is a diagram illustrating a data processing flow at the time of data control setting addition completion of the second embodiment.

FIG. 14 is a diagram illustrating a data processing flow at the time of data control setting addition completion.

As the data processing units 5, the data processing unit 5-1″ and the data processing unit 5-2″ operate. The data processing unit 5-1″ executes data processing of the data processing setting 51-1″, the data processing setting 51-2″, and the data processing setting 51-3″ regarding the data source 3-1, the data source 3-2, and the data source 3-3 where a change in the data control setting is unnecessary and the data processing setting 51-*a* regarding the data source 3-4 that is the added data control setting. The data processing unit 5-2″ executes data processing of the data processing setting 51-4″, the data processing setting 51-5″, and the data processing setting 51-6″ regarding the data source 3-1, the data source 3-2, and the data source 3-3 where a change in the data control setting is unnecessary and the data processing setting 51-*b* b regarding the data source 3-4 that is the added data control setting.

In the second embodiment, in a circumstance where data processing units that simultaneously execute a plurality of data processing flows are connected in multiple stages to execute data processing, when an operation of a data collection target is added, the data control settings can be added without stopping data processing.

The computer system according to the embodiment includes: a data control design unit configured to generate, when a part of a plurality of data processing settings is changed in multi-stage data processing in an environment where the data processing settings are mixed in data processing units, an identifier that is assigned to each of data processing settings of a system before and a system after data processing setting change; and a data control management unit configured to generate each of the data processing units including data processing settings of a data processing setting change target and a data processing setting non-change target and to start all of the system before the data processing setting change and the system after the data processing setting change to execute the data processing, in which the system that executes the data processing is discriminated using the identifier in a rear-stage data processing unit.

According to the embodiments, in a use case where multiple data processing flows are executed in parallel, when one data processing setting is changed, a data processing flow of a change target can be changed without stopping a data processing flow of a non-change target.

What is claimed is:

1. A data processing system that changes processing setting of multi-stage data processing without stopping the multi-stage data processing, the data processing system comprising:
a plurality of processors that collectively perform the multi-stage data processing, wherein each of the plurality of processes perform a respective stage of the multi-stage data processing;
a data management computer that is communicatively coupled to the plurality of the processors, wherein the data management computer is configured to assign a tag as an identifier to each of data control settings,
wherein each processor of the plurality of processors is configured to:
append the tag to a result of the respective stage based on the data control settings of the each processor that processed the respective stage.

2. The data processing system according to claim 1, wherein each processor of the plurality of processors are further configured to:
compare control settings of the each processor with the tag appended to the result in a prior processing stage in the multi-stage data processing.

3. The data processing system according to claim 1, wherein the data management computer is further configured to:
instruct all of the plurality of processors to start and stop during a change or an addition of the data control settings,
start one or more of the plurality of processors that are required for the multi-stage data processing, and
stop one or more processors of the plurality of processors that are not required for the multi-stage data processing.

4. The data processing system according to claim 3, wherein the data management computer is further configured to:
change a data processing setting of a particular processor among the plurality of processors;
determine whether the result of a particular stage processed by the particular processor is correct after the data processing setting is changed.

5. The data processing system according to claim 4, wherein when the result of the particular stage is not correct, the management computer is further configured to, stop a processor that is subsequent to the particular processor.

6. The data processing system according to claim 1, wherein the data management computer includes a display unit configured to display each of operational statuses of the, data processing settings of the plurality of processors, and the tag of each of the data control settings.

7. A data processing method that changes processing for multi-stage data processing without stopping the multi-stage data processing, the method comprising:
assigning a tag as an identifier to each of data control settings;
appending, by each processor among a plurality of processors that collectively perform the multi-stage data processing, the tag to a result of a respective stage of the multi-stage data processing performed by the each processor based on the data control settings of the each processor that processed the respective stage.

8. The data processing method according to claim 7, further comprising:
comparing control settings of the each processor with the tag appended to the result in a prior processing stage in the multi-stage data processing.

9. The data processing method according to claim 7, further comprising:
changing a data processing setting of a particular processor among the plurality of processors; and
determining whether the result of a particular stage processed by the particular processor is correct after the data processing setting is changed.

* * * * *